(12) United States Patent
Gouke

(10) Patent No.: US 7,094,482 B2
(45) Date of Patent: Aug. 22, 2006

(54) RECORDING MEDIUM HAVING MAGNETIC LAYER OF SMALLER THICKNESS

(75) Inventor: Takashi Gouke, Higashine (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/353,609

(22) Filed: Jan. 29, 2003

(65) Prior Publication Data

US 2004/0033391 A1 Feb. 19, 2004

(30) Foreign Application Priority Data

Aug. 15, 2002 (JP) .............................. 2002-236942

(51) Int. Cl.
B32B 5/66 (2006.01)
B32B 5/70 (2006.01)

(52) U.S. Cl. .................... 428/827; 428/828.1

(58) Field of Classification Search ........ 428/694 TM, 428/694 TS, 336, 212, 900, 827, 828.1, 829
See application file for complete search history.

(56) References Cited

U.S. PATENT DOCUMENTS

| 5,736,262 | A | * | 4/1998 | Ohkijima et al. ........... 428/611 |
| 6,071,607 | A | * | 6/2000 | Okuyama et al. ........... 428/332 |
| 6,274,233 | B1 | | 8/2001 | Yoshikawa et al. ......... 428/332 |
| 6,610,424 | B1 | | 8/2003 | Acharya et al. |
| 6,645,647 | B1 | * | 11/2003 | Litvinov et al. ..... 428/694 TM |
| 6,828,036 | B1 | * | 12/2004 | Munteanu et al. .......... 428/611 |
| 2002/0028355 | A1 | * | 3/2002 | Nakamura et al. ... 428/694 TM |
| 2003/0138665 | A1 | * | 7/2003 | Kanbe et al. ................ 428/693 |
| 2004/0013910 | A1 | | 1/2004 | Acharya et al. |

FOREIGN PATENT DOCUMENTS

| JP | 63-014310 | 1/1988 |
| JP | 02-121116 | 5/1990 |
| JP | 05-258304 | 10/1993 |
| JP | 09-204628 | 8/1997 |
| JP | 11-283230 | 10/1999 |
| JP | 2001-148109 | 5/2001 |
| JP | 2001-291223 | 10/2001 |
| JP | 2002-008219 | 1/2002 |
| JP | 2002-197634 | 7/2002 |
| JP | 2004-515028 | 5/2004 |
| WO | WO 02/45080 | 6/2002 |

* cited by examiner

Primary Examiner—Holly Rickman
(74) Attorney, Agent, or Firm—Greer, Burns & Crain, Ltd.

(57) ABSTRACT

A polycrystalline structure film is formed on the surface of a substrate in a magnetic recording medium. The second magnetic layer has a saturation magnetic flux density Bs larger than that of the first magnetic layer in the polycrystalline structure film, so that the magnetic layer for recordation ensures a larger residual magnetization Br, as compared with the case where the first magnetic layer solely forms a magnetic layer for recordation. A sufficient magnitude of product tBr of thickness t and residual magnetization Br can be obtained even if the thickness of the overall magnetic layer for recordation is reduced. A sufficient magnitude of magnetic outputs can be ensured. A reduced thickness of the magnetic layer serves to minimize the magnetic crystal grains in the first and second magnetic layers. A higher resolution of recordation and reproduction can be obtained.

19 Claims, 4 Drawing Sheets

RECORDING MEDIUM HAVING MAGNETIC LAYER OF SMALLER THICKNESS

BACKGROUND OF THE INVENTION

1. Field of the Invention

The present invention relates to a magnetic recording medium such as a magnetic recording disk incorporated within a hard disk drive (HDD), for example.

2. Description of the Prior Art:

In general, a magnetic layer for recordation is layered on the surfaces of a substrate in a magnetic recording disk. The magnetic layer may include magnetic crystal grains formed based on cobalt (Co) atoms. As conventionally known, chromium (Cr) atoms are usually forced to diffuse along the boundaries between the adjacent ones of the magnetic crystal grains in the magnetic layer. This local diffusion of the Cr atoms serves to generate non-magnetic walls between the adjacent magnetic crystal grains. The Cr non-magnetic walls function to prevent the magnetic interaction between the adjacent magnetic crystal grains. The prevention of the magnetic interaction between the adjacent magnetic crystal grains in this manner reduces noise in reading out magnetic bit data from the magnetic recording disk.

The size of the magnetic crystal grains should be minimized to improve the recording density in the magnetic layer. It is well known that reduction in the thickness of the magnetic layer leads to minimization of the magnetic crystal grains. However, a reduced thickness of the magnetic layer inevitably induces a reduction in tBr, the product of thickness and residual magnetization, so that the intensity is reduced in the magnetic field leaking out of the magnetic layer. It is accordingly difficult to obtain the magnetic output of a sufficient magnitude. In addition, a reduced thickness of the magnetic layer is accompanied with a reduction in the coercivity Hc. If the coercivity Hc gets reduced, the magnetic bit data on the magnetic layer tends to get broken due to a thermal disturbance or the like.

SUMMARY OF THE INVENTION

It is accordingly an object of the present invention to provide a magnetic recording medium having a magnetic layer of a smaller thickness without a reduction in the coercivity so as to enjoy write signals of a higher frequency.

According to the present invention, there is provided a magnetic recording medium comprising: a first magnetic layer having a first value of saturation magnetic flux density; and a second magnetic layer overlying on the first magnetic layer, said second magnetic layer having a second value of saturation magnetic flux density larger than the first value.

The first and second magnetic layers in combination may establish a magnetic layer for recordation in the magnetic recording medium. Since the second magnetic layer has a saturation magnetic flux density Bs larger than that of the first magnetic layer, the magnetic layer for recordation ensures a larger residual magnetization Br, as compared with the case where the first magnetic layer solely forms a magnetic layer for recordation. A sufficient tBr, namely, a sufficient magnitude of product of thickness and residual magnetization can be obtained even if the thickness of the overall magnetic layer for recordation is reduced. A sufficient magnitude of magnetic outputs can be ensured.

Moreover, a sufficient coercivity can be ensured in the multilayered structure of the first and second magnetic layers. A reduction in the coercivity can be avoided irrespective of a reduction in the thickness. Once information data is recorded within the first and second magnetic layers, the data is reliably maintained for a longer time within the first and second magnetic layers, namely, within the magnetic layer for recordation.

The first magnetic layer may include: magnetic crystal grains formed based on Co atoms; and a non-magnetic wall established between adjacent ones of the magnetic crystal grains and comprising Cr atoms. Likewise, the second magnetic layer may include: magnetic crystal grains formed based on Co atoms; and a non-magnetic wall established between adjacent ones of the magnetic crystal grains and comprising Cr atoms. In this case, the content of the Cr atoms in the second magnetic layer should be set smaller than that of the Cr atoms in the first magnetic layer. Here, the second value of saturation magnetic flux density for the second magnetic layer should be set equal to or larger than 0.5[T].

If the thickness of the first and second magnetic layers can be reduced without a reduction in tBr in the aforementioned manner, the magnetic crystal grains can be minimized in the first and second magnetic layers. A higher resolution of recordation and reproduction can be obtained. It is reliably possible to write information data into the first and second magnetic layers at a higher frequency. A higher frequency of data signals leads to a higher recording density of the magnetic recording medium.

According to the observation by the inventor, the thickness of the second magnetic layer is preferably set in a range between 0.5 nm and 3.0 nm. Since the content of non-magnetic atoms such as Cr atoms is set smaller in the second magnetic layer rather than the first magnetic layer, the non-magnetic walls may hardly be established between the adjacent magnetic crystal grains in the second magnetic layer. The magnetic interaction cannot sufficiently be avoided between the adjacent magnetic crystal grains in the second magnetic layer. If the thickness of the second magnetic layer exceeds 3.0 nm, the property of the second magnetic layer tends to dominantly appear in the multilayered structure of the first and second magnetic layers. Noise cannot sufficiently be suppressed in reproduction of information data.

Otherwise, the first magnetic layer may overlie on a magnetic substratum. The magnetic substratum may include: magnetic crystal grains formed based on Co atoms; and a non-magnetic wall established between adjacent ones of the magnetic crystal grains and comprising Cr atoms. The magnetic substratum serves to align the easy magnetization axes of the magnetic crystal grains within the surface or in parallel with the surface in the first magnetic layer. The thickness of the magnetic substratum is preferably set in a range between 0.1 nm and 3.5 nm. According to the observation by the inventor, noise cannot sufficiently be suppressed in reproduction of information data if the thickness of the magnetic substratum falls out of the aforementioned range.

Furthermore, the magnetic substratum may overlie on a non-magnetic substratum. The non-magnetic substratum may contain any non-magnetic atoms such as Cr atoms, for example. When the non-magnetic substratum is solely made of Cr, the thickness of the non-magnetic substratum should be set in a range between 0.1 nm and 3.5 nm.

It should be noted that the magnetic recording medium may include any types of media including a magnetic recording disk in general incorporated within a hard disk drive (HDD), for example.

BRIEF DESCRIPTION OF THE DRAWINGS

The above and other objects, features and advantages of the present invention will become apparent from the following description of the preferred embodiment in conjunction with the accompanying drawings, wherein.

DESCRIPTION OF THE PREFERRED EMBODIMENT

Figure 1:
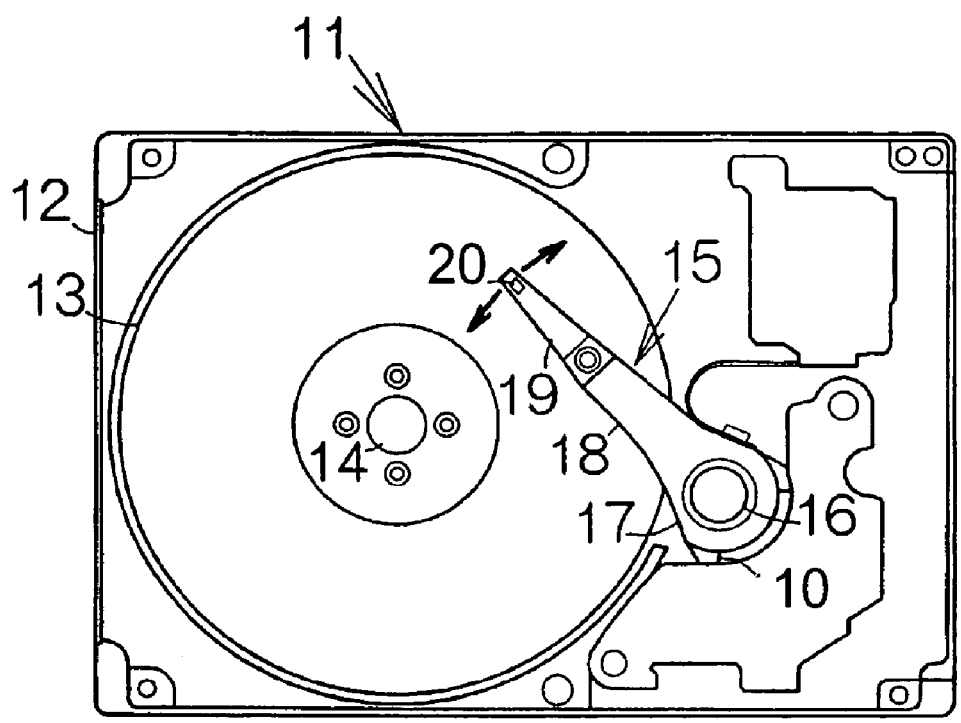
FIG. 1 is a plan view schematically illustrating the inner structure of a hard disk drive (HDD) as an example of a magnetic recording medium drive.

FIG. 1 schematically illustrates the inner structure of a hard disk drive (HDD) 11 as an example of a recording medium drive or storage device. The HDD 11 includes a box-shaped primary enclosure 12 defining an inner space of a flat parallelepiped, for example. At least one magnetic recording disk 13 is incorporated in the inner space within the primary enclosure 12. The magnetic recording disk 13 is mounted on the driving shaft of a spindle motor 14. The spindle motor 14 is allowed to drive the magnetic recording disk 13 for rotation at a higher revolution speed such as 7,200 rpm or 10,000 rpm, for example. A cover, not shown, is coupled to the primary enclosure 12 so as to define the closed inner space between the primary enclosure 12 and itself.

A head actuator 15 is also incorporated within the inner space of the primary enclosure 12. The head actuator 15 includes an actuator block 17 supported on a vertical support shaft 16 for rotation. Rigid actuator arms 18 are defined in the actuator block 17. The actuator arms 18 are designed to extend in a horizontal direction from the vertical support shaft 16. The actuator arms 18 are associated with the front and back surfaces of the magnetic recording disk or disks 13, respectively. The actuator block 17 may be made of aluminum. Molding process may be employed to form the actuator block 17.

Elastic head suspensions 19 are fixed to the tip ends of the actuator arms 18. The individual head suspension 19 is designed to extend forward from the corresponding tip end of the actuator arm 18. As conventionally known, a flying head slider 20 is supported on the front end of the individual head suspension 19. The flying head sliders 20 are related to the actuator block 17 in this manner. The flying head sliders 20 are opposed to the surfaces of the magnetic recording disk or disks 13.

An electromagnetic transducer, not shown, is mounted on the flying head slider 20. The electromagnetic transducer may include a read element such as a giant magnetoresistive (GMR) element or a tunnel-junction magnetoresistive (TMR) element, and a write element such as a thin film magnetic head. The GMR or TMR element is designed to discriminate magnetic bit data on the magnetic recording disk 13 by utilizing variation in the electric resistance of a spin valve film or a tunnel-junction film. The thin film magnetic head is designed to write magnetic bit data into the magnetic recording disk 13 by utilizing a magnetic field induced at a thin film coil pattern.

The head suspension 19 serves to urge the flying head slider 20 toward the surface of the magnetic recording disk 13. When the magnetic recording disk 13 rotates, the flying head slider 20 is allowed to receive airflow generated along the rotating magnetic recording disk 13. The airflow serves to generate a lift on the flying head slider 20. The flying head slider 20 is thus allowed to keep flying above the surface of the magnetic recording disk 13 during the rotation of the magnetic recording disk 13 at a higher stability established by the balance between the lift and the urging force of the head suspension 19.

A power source 10 such as a voice coil motor (VCM) is connected to the actuator block 17. The power source 10 drives the actuator block 17 for rotation around the support shaft 16. The rotation of the actuator block 17 induces the swinging movement of the actuator arms 18 and the head suspensions 19. When the actuator arm 18 is driven to swing about the support shaft 16 during the flight of the flying head slider 20, the flying head slider 20 is allowed to cross the recording tracks defined on the magnetic recording disk 13 in the radial direction of the magnetic recording disk 13. This radial movement serves to position the flying head slider 20 right above a target recording track on the magnetic recording disk 13. As conventionally known, in the case where two or more magnetic recording disks 13 are incorporated within the inner space of the primary enclosure 12, a pair of the elastic head suspensions 19 and the actuator arms 18 are disposed between the adjacent magnetic recording disks 13.

Figure 2:
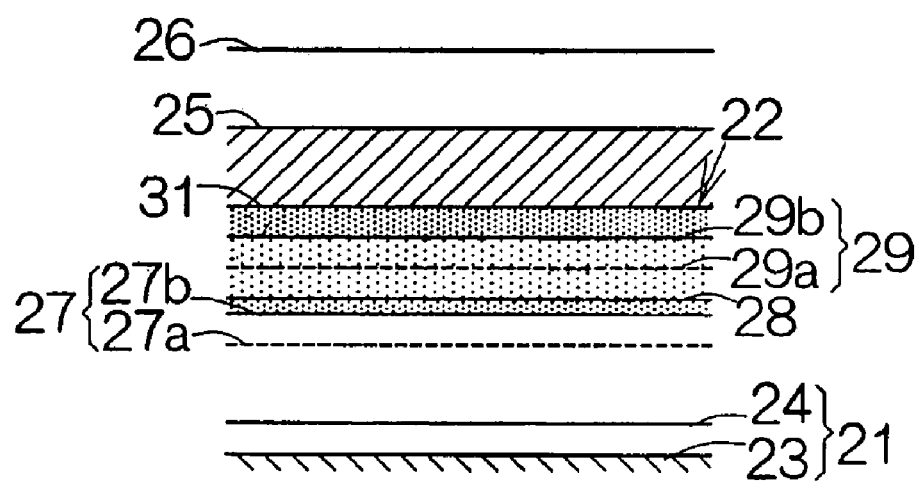
FIG. 2 is an enlarged vertical sectional view schematically illustrating the structure of a magnetic recording disk according to a specific example of the present invention.

FIG. 2 illustrates a sectional view, taken along a plane parallel to the rotational axis of the magnetic recording disk 13. The magnetic recording disk 13 includes a substrate 21 as a support member, and layered polycrystalline structure films 22 extending over the front and back surfaces of the substrate 21, respectively. The substrate 21 may comprise a disk-shaped aluminum (Al) body 23 and NiP laminations 24 covering over the front and back surfaces of the Al body 23, for example. A glass substrate may be employed in place of the Al substrate 21. A magnetic information data is recorded in the layered polycrystalline structure films 22. The layered polycrystalline structure film 22 is covered with a carbon protection overcoat 25, such as a diamond-like-carbon film, and a lubricating agent film 26.

The layered polycrystalline structure film 22 includes a crystalline substratum 27 overlying on the surface of the substrate 21. The crystalline substratum 27 includes a first non-magnetic layer 27a overlying on the surface of the NiP lamination 24, and a second non-magnetic layer 27b overlying on the surface of the first non-magnetic layer 27a. The first and second non-magnetic layers 27a, 27b may be made of a non-magnetic material including Cr atoms, for example. In this case, molybdenum (Mo) and/or tungsten (W) atoms are added within the second non-magnetic layer 27b. Mo and W have a lattice constant larger than that of Cr.

A magnetic substratum 28 overlies on the surface of the second non-magnetic layer 27b. The magnetic substratum 28 may be formed of a Co-based alloy, such as a CoCrTa alloy, having a hexagonal close-packed(hcp) structure, for example. At least one of chromium (Cr), tantalum (Ta), Mo, manganese (Mn), rhenium (Re) and ruthenium (Ru) are preferably added within the magnetic substratum 28. The magnetic substratum 28 includes magnetic crystal grains based on cobalt (Co) atoms. Cr non-magnetic walls are established between any adjacent ones of the magnetic crystal grains. The Cr non-magnetic walls serve to prevent the magnetic interaction between the magnetic crystal grains. The thickness of the magnetic substratum 28 may be set in a range between 0.1 nm and 3.5 nm, for example.

A first magnetic layer 29 overlies on the surface of the magnetic substratum 28. The first magnetic layer 29 maybe formed of CoCrPtB alloy layers 29a, 29b, for example. The content of Pt in the lower CoCrPtB alloy layer 29a is set larger than that in the upper CoCrPtB alloy layer 29b. The content of Cr in the upper CoCrPtB alloy layer 29b is set smaller than that in the lower CoCrPtB alloy layer 29a. The first magnetic layer 29 includes magnetic crystal grains based on Co atoms. Cr non-magnetic walls are established between any adjacent ones of the magnetic crystal grains. The Cr non-magnetic walls serve to prevent the magnetic interaction between the magnetic crystal grains. Alternatively, the first magnetic layer 29 may be made of a single Co-based alloy layer.

A second magnetic layer 31 overlies on the surface of the first magnetic layer 29. The second magnetic layer 31 may be formed of a Co-based alloy, such as CoCrTa alloy, having a hexagonal close-packed (hcp) structure, for example. The second magnetic layer 31 includes magnetic crystal grains based on Co atoms. Cr non-magnetic walls are established between any adjacent ones of the magnetic crystal grains. The Cr non-magnetic walls serve to prevent the magnetic interaction between the magnetic crystal grains. The thickness of the second magnetic layer 31 may be set in a range between 0.5 nm and 3.0 nm, for example. Here, the second magnetic layer 31 is allowed to have a saturation magnetic flux density Bs or saturation magnetization larger than that of the first magnetic layer 29. The content [at %] of Cr atoms in the second magnetic layer 31 is set smaller than that in the first magnetic layer 29 so as to establish a higher saturation magnetic flux density Bs. The second magnetic layer 31 is allowed to enjoy a saturation magnetic flux density equal to or larger than 0.5[T].

The first and second magnetic layer 29, 31 in combination form the magnetic layer for recordation in the layered polycrystalline structure film 22. Since the second magnetic layer 31 has a saturation magnetic flux density Bs larger than that of the first magnetic layer 29, the magnetic layer for recordation ensures a larger residual magnetization Br, as compared with the case where the first magnetic layer 29 solely forms a magnetic layer for recordation. A sufficient tBr, namely, a sufficient magnitude of product of thickness and residual magnetization can be obtained even if the thickness of the overall magnetic layer for recordation is reduced. A sufficient magnitude of magnetic outputs can be ensured.

If the thickness of the first and second magnetic layers 29, 31 can be reduced without a reduction in tBr in the aforementioned manner, the magnetic crystal grains can be minimized in the first and second magnetic layers 29, 31. A higher resolution of recordation and reproduction can be obtained. It is reliably possible to write magnetic bit data into the first and second magnetic layers 29, 31 at a higher frequency. A higher frequency of bit data signals leads to a higher recording density of the magnetic recording disk 13. The resolution of recordation and reproduction (Res) can be expressed as follows:

$$Res = \frac{VF2}{VF8} \cdot 100[\%] \qquad (1)$$

Here, VF2 and VF8 indicate the magnitude of the magnetic output from the magnetic layer for recordation. Bit data signals of a frequency corresponding to half the maximum frequency is written into the magnetic layer for recordation for the detection of VF2. Likewise, bit data signals of a frequency corresponding to one eighth the maximum frequency is written into the magnetic layer for recordation for the detection of VF8. The maximum frequency can be set at any frequency. As conventionally known, the larger the value of the resolution (Res) gets in a magnetic layer for recordation, the larger the magnitude of magnetic outputs gets for magnetic bit data at a higher frequency. Bit data can be written into the magnetic recording disk 13 at a higher frequency in response to improvement in the resolution (Res).

Furthermore, a sufficient coercivity Hc can be ensured in the multilayered structure of the first and second magnetic layers 29, 31. A reduction in the coercivity Hc can be avoided irrespective of a reduction in the thickness. Once magnetic bit data is recorded within the first and second magnetic layers 29, 31, the data is reliably maintained for a longer time within the first and second magnetic layers 29, 31, namely, within the magnetic layer for recordation.

Next, a brief description will be made on a method of making the magnetic recording disk 13. A disk-shaped substrate 21 is first prepared. The NiP laminations 24 may be previously formed to extend over the surfaces of the substrate 21. Electroless plating may be employed to form the NiP laminations 24, for example. The substrate 21 is set in a sputtering apparatus, for example. The layered polycrystalline structure films 22 are formed within the chamber of the sputtering apparatus. The related method will be described later in detail. Thereafter, the carbon protection overcoat 25 and the lubricating agent film 26 are formed to cover over the surfaces of the layered polycrystalline structure films 22. Chemical vapor deposition (CVD) or the like may be employed to form the carbon protection overcoat 25, for example.

The sputtering apparatus realizes a so-called direct current (DC) magnetron sputtering. Argon (Ar) gas is introduced into the chamber of the sputtering apparatus. The inside pressure of 0.67[Pa] is maintained in the chamber, for example. A vacuum atmosphere of approximately $4.0 \times 10^{-5}$[Pa] is established in the chamber prior to the introduction of the Ar gas.

The substrate 21 is subjected to heat treatment of 220 degrees Celsius prior to the actual deposition. The applied heat serves to remove any impurities attaching to the surface of the substrate 21. Here, the substrate 21 is preferably heated to a temperature equal to or higher than 200 degrees Celsius. However, the temperature of the substrate 21 should stay at or below 270 degrees Celsius. Heat exceeding 270 degrees Celsius promotes crystallization of the NiP laminations 24 for establishment of magnetization in the NiP laminations 24.

Figure 3:
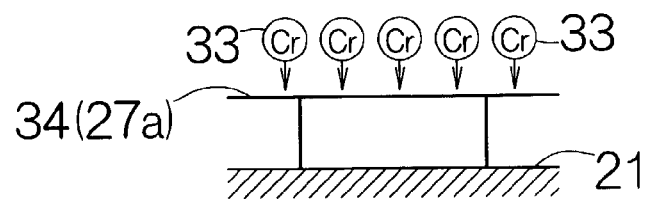
FIG. 3 is a partial vertical sectional view of a substrate for schematically illustrating a process for depositing a first non-magnetic layer.

As shown in FIG. 3, the first non-magnetic layer 27a is then formed to cover over the surface of the substrate 21. A Cr target is set in the sputtering apparatus. Cr atoms 33 are allowed to deposit on the surface of the substrate 21. The Cr atoms 33 form crystal grains on the substrate 21. The substrate 21 is maintained at a higher temperature, so that the orientation of the crystal grains is aligned in a predetermined direction in a Cr layer 34 growing on the substrate 21. The thickness of the Cr layer 34 maybe set at approximately 5.0 nm, for example.

Figure 4:
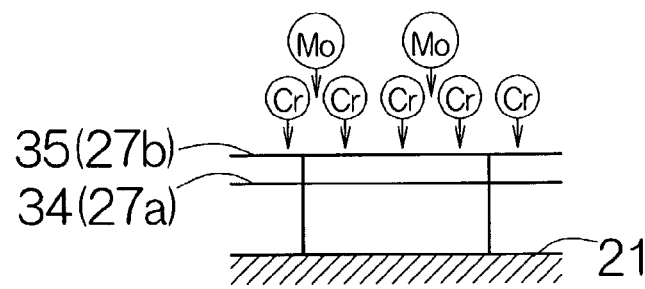
FIG. 4 is the partial vertical sectional view of the substrate for schematically illustrating a process for depositing a second non-magnetic layer.

As shown in FIG. 4, the second non-magnetic layer 27b is thereafter formed to cover over the surface of the Cr layer 34. A CrMo target is set in the sputtering apparatus. The CrMo target contains Mo atoms at a predetermined amount. A CrMo alloy layer 35 is formed over the surface of the Cr layer 34 in this manner. The CrMo alloy layer 35 is allowed to grow based on the epitaxy from the aforementioned Cr layer 34. The thickness of the CrMo alloy layer 35 is set at approximately 2.0 nm.

Figure 5:
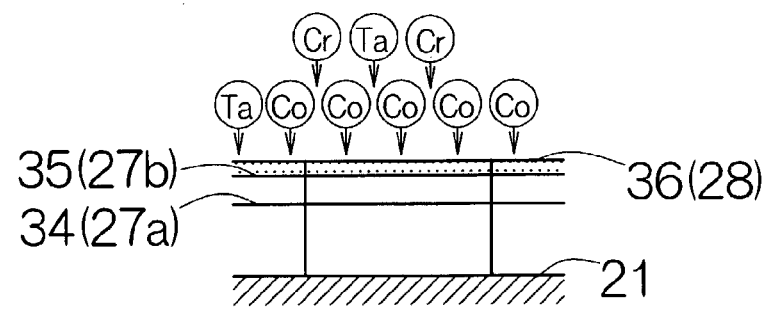
FIG. 5 is a partial vertical sectional view of a substrate for schematically illustrating a process for depositing a magnetic substratum.

As shown in FIG. 5, the magnetic substratum 28 is then formed to extend over the surface of the CrMo alloy layer 35. A CoCrTa target is set in the sputtering apparatus. A CoCrTa alloy layer 36 is formed on the surface of the CrMo alloy layer 35. The CoCrTa alloy layer 36 is allowed to grow based on the epitaxy from the CrMo alloy layer 35. The thickness of the CoCrTa alloy layer 36 may be set in a range between 0.1 nm and 3.5 nm.

Figure 6:
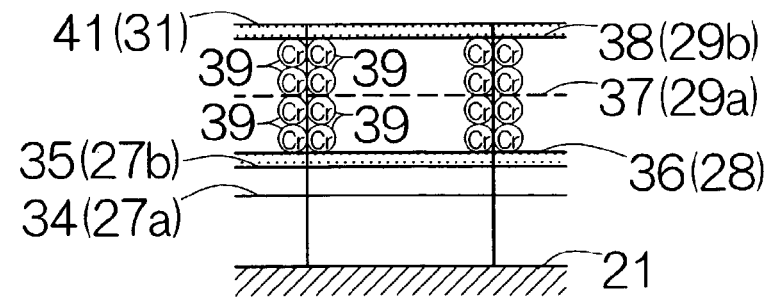
FIG. 6 is a partial vertical sectional view of a substrate for schematically illustrating a process for depositing first and second magnetic layers.

As shown in FIG. 6, the first and second magnetic layers 29, 31 are subsequently formed on the surface of the CoCrTa alloy layer 36. A CoCrPtB target is set in the sputtering apparatus for the deposition of the first magnetic layer 29. Likewise, a CoCrTa target is set in the sputtering apparatus for the deposition of the second magnetic layer 31. The content [at %] of Cr atoms in the CoCrTa target is set smaller than that in the CoCrPtB target. CoCrPtB alloy layers 37, 38 are sequentially formed on the surface of the CoCrTa alloy layer 36. Magnetic crystal grains are allowed to grow in the CoCrPtB alloy layers 37, 38 based on the epitaxy. The aforementioned Cr layer 34 serves to align the easy magnetization axes of the magnetic crystal grains within the surfaces of the CoCrPtB alloy layers 37, 38. The substrate 21 is maintained at a higher temperature, so that Cr atoms 39 are allowed to diffuse along the boundaries between the adjacent magnetic crystal grains. The Cr atoms 39 form the non-magnetic walls. A CoCrTa alloy layer 41 is then formed to cover over the surface of the CoCrPtB alloy layer 38. A saturation magnetic flux density Bs of approximately 0.5[T] may be established in the CoCrTa alloy layer 41. The thickness t of the multilayered structure of the first and second magnetic layers 29, 31 may be aimed based on tBr equal to approximately 5.5[nTm], for example.

The inventor has observed the magnetic characteristic of the layered polycrystalline structure film 22 made in accordance with the aforementioned method. The thickness of the first non-magnetic layer 27a or Cr layer 34 was set at 5.0 nm. The thickness of the second non-magnetic layer 27b or CrMo alloy layer 35 was set at 2.0 nm. The saturation magnetic flux density Bs of the second magnetic layer 31 or CoCrTa alloy layer 41 was set at 0.5[T]. In this respect, the content [at%] of the Cr atoms was properly adjusted in the second magnetic layer 31. The tBr of 5.5[nTm] was set in the multilayered structure of the first and second magnetic layers 29, 31.

Figure 7:
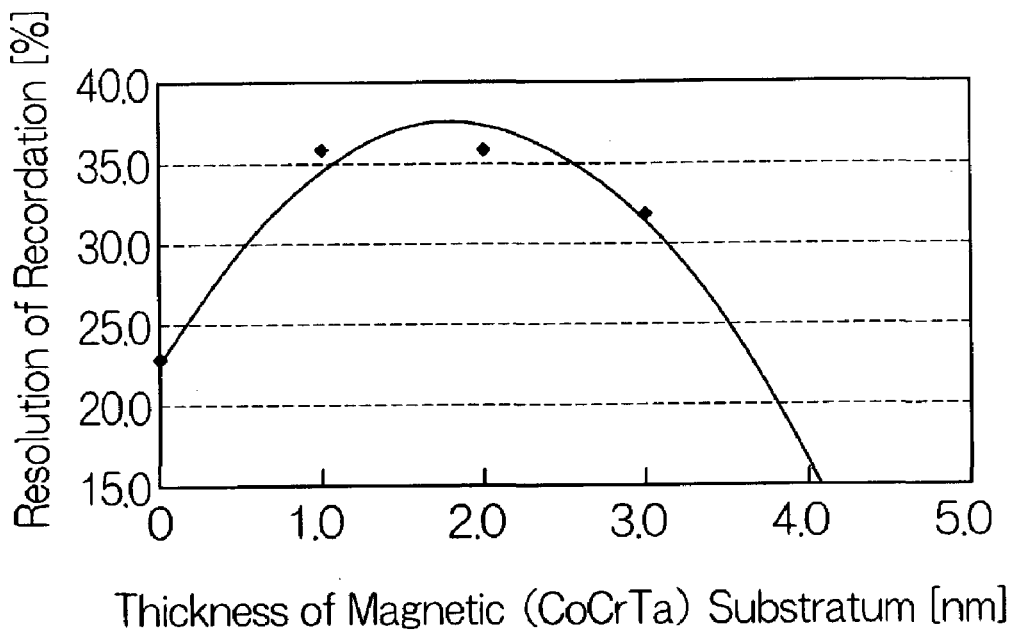
FIG. 7 is a graph illustrating the relationship between the thickness of the magnetic substratum and the resolution of recordation and reproduction.

The inventor has measured the resolution of recordation and reproduction for the layered polycrystalline structure film 22. A giant magnetoresistive (GMR) head was employed for the measurement. The thickness of the magnetic substratum 28 or CoCrTa alloy layer 36 was set at 1.0 nm, 2.0 nm and 3.0 nm. The magnetic substratum 28 was omitted from a comparative example. As is apparent from FIG. 7, the maximum value of the resolution (Res) has been observed in the vicinity of the thickness equal to 2.0 nm. When the thickness of the magnetic substratum 28 falls in a range between 0.1 nm and 3.5 nm, the resolution (Res) was sufficiently improved.

Figure 8:
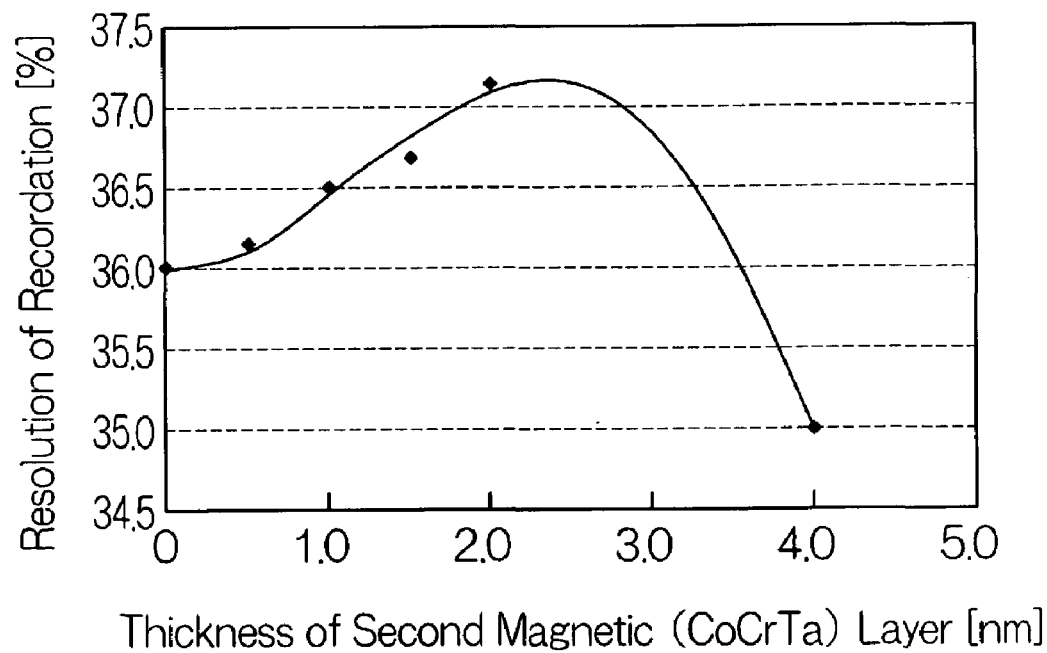
FIG. 8 is a graph illustrating the relationship between the thickness of the second magnetic layer and the resolution of recordation and reproduction.

Likewise, the inventor has measured the resolution (Res) of the layered polycrystalline structure film 22. In this case, the thickness of the magnetic substratum 28 was fixed to 2.0 nm, while the thickness of the second magnetic layers 31 or CoCrTa alloy layer 41 was set at 0.5 nm, 1.0 nm, 1.5 nm, 2.0 nm and 4.0 nm. The thickness of the first magnetic layer 29 was adjusted in response to the change in the thickness of the second magnetic layer 31. The tBr of the multilayered structure of the first and second magnetic layers 29, 31 was set at 5.5[nTm]. The second magnetic layer 31 was omitted in a comparative example. As is apparent from FIG. 8, the maximum value of the resolution (Res) has been observed in the vicinity of the thickness ranging from 2.0 nm to 2.5 nm. When the thickness of the second magnetic layer 31 falls in a range between 0.5 nm and 3.0 nm, the resolution (Res) was sufficiently improved.

Figure 9:
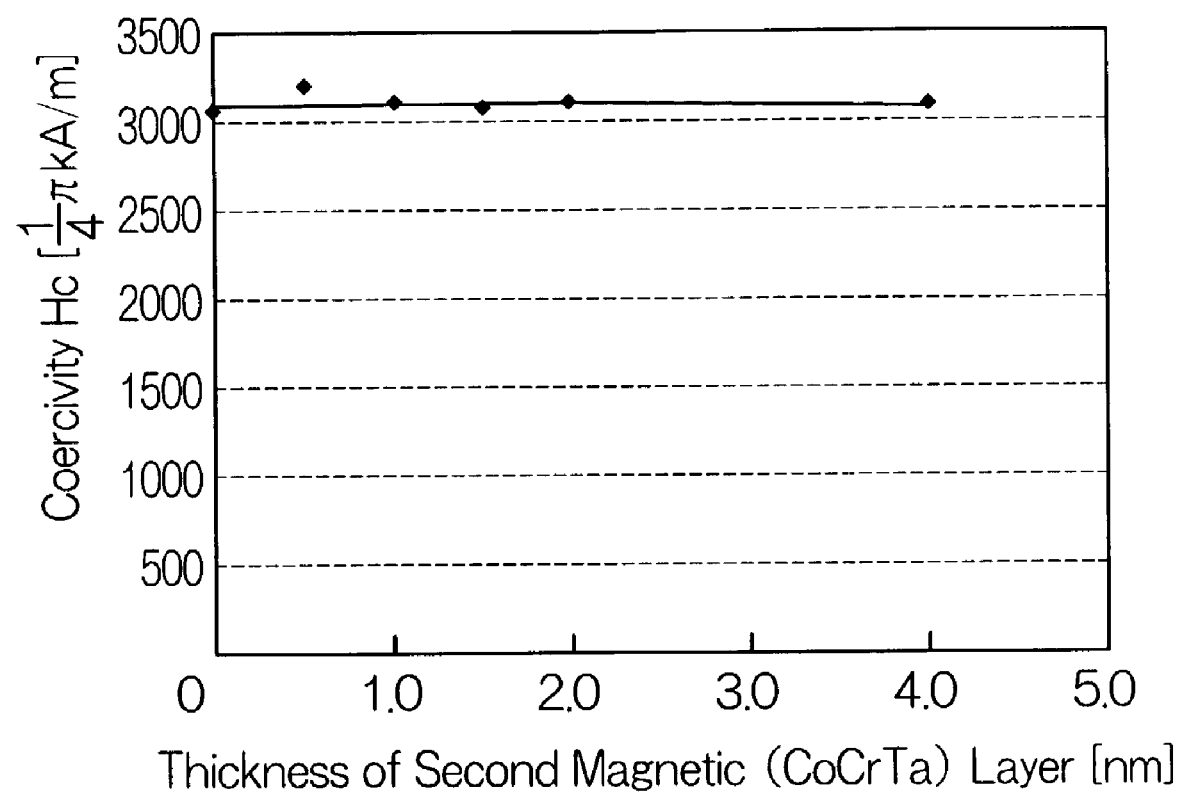
FIG. 9 is a graph illustrating the relationship between the thickness of the second magnetic layer and the coercivity.

Furthermore, the inventor has measured the coercivity Hc of the layered polycrystalline structure film 22. In this case, the thickness of the second magnetic layer 31 was changed in the same manner as described above. A vibrating sample magnetometer (VSM) was employed to measure the coercivity Hc. As is apparent from FIG. 9, a constant coercivity Hc was observed in the layered polycrystalline structure film 22 irrespective of the changed thickness of the second magnetic layer 31. In other words, even when the thickness of the multilayered structure of the first and second magnetic layers 29, 31 gets reduced in response to an increase in the thickness of the second magnetic layer 31, a sufficient coercivity Hc can be ensured in the layered polycrystalline structure film 22.

What is claimed is:

1. A magnetic recording medium comprising:
   a first magnetic recording layer having a first value of saturation magnetic flux density, said first magnetic recording layer including Co atoms and additional atoms so as to form magnetic crystal grains, said additional atoms belonging to at least one element selected from a group consisting of Pt and B, non-magnetic Cr atoms diffusing along a boundary between adjacent ones of the magnetic crystal grains; and
   a second magnetic recording layer directly formed on the first magnetic recording layer, said second magnetic recording layer having a second value of saturation magnetic flux density larger than the first value, the second magnetic recording layer being made of a Co-based alloy; and
   a carbon protection layer directly formed on the second magnetic recording layer.

2. The magnetic recording medium according to claim 1, wherein said second value of saturation magnetic flux density is set equal to or larger than 0.5[T].

3. The magnetic recording medium according to claim 2, wherein said second magnetic recording layer includes Co atoms so as to form magnetic crystal grains, Cr atoms diffusing along a boundary between adjacent ones of the magnetic crystal grains of the second magnetic recording layer.

4. The magnetic recording medium according to claim 3, wherein a content of the Cr atoms in the second magnetic recording layer is set smaller than that of the Cr atoms in the first magnetic recording layer.

5. A magnetic recording medium comprising:
a first magnetic recording layer having a first value of saturation magnetic flux density and including magnetic crystal grains and non-magnetic atoms, said non-magnetic atoms diffusing along a boundary between adjacent ones of the magnetic crystal grains; and
a second magnetic recording layer directly formed on the first magnetic recording layer, said second magnetic recording layer having a second value of saturation magnetic flux density larger than the first value, a thickness of the second magnetic recording layer being set in a range between 0.5 nm and 3.0 nm; and
a carbon protection layer directly formed on the second magnetic recording layer.

6. The magnetic recording medium according to claim 5, wherein said second value of saturation magnetic flux density is set equal to or larger than 0.5[T].

7. The magnetic recording medium according to claim 6, wherein said second magnetic recording layer includes Co atoms so as to form magnetic crystal grains, Cr atoms diffusing along a boundary between adjacent ones of the magnetic crystal grains of the second magnetic recording layer.

8. The magnetic recording medium according to claim 7, wherein a content of the Cr atoms in the second magnetic recording layer is set smaller than that of the Cr atoms in the first magnetic recording layer.

9. The magnetic recording medium according to claim 1, wherein said first magnetic recording layer overlies on a magnetic substratum, said magnetic substratum including Co atoms so as to form magnetic crystal grains, and Cr atoms diffusing along a boundary between adjacent ones of the magnetic crystal grains of the magnetic substratum.

10. The magnetic recording medium according to claim 9, wherein said magnetic substratum overlies on a non-magnetic substratum.

11. The magnetic recording medium according to claim 9, wherein a thickness of the magnetic substratum is set in a range between 0.1 nm and 3.5nm.

12. The magnetic recording medium according to claim 11, wherein said magnetic substratum overlies on a non-magnetic substratum.

13. A magnetic recording medium comprising:
a magnetic substratum including magnetic crystal grains and non-magnetic atoms, said non-magnetic atoms diffusing along a boundary between adjacent ones of the magnetic crystal grains;
a first magnetic recording layer directly formed on the magnetic substratum, said first magnetic recording layer having a first value of saturation magnetic flux density; and
a second magnetic recording layer directly formed on the first magnetic recording layer, said second magnetic recording layer having a second value of saturation magnetic flux density larger than the first value.

14. The magnetic recording medium according to claim 13, wherein said magnetic crystal grains are formed based on Co atoms.

15. The magnetic recording medium according to claim 13, wherein said second value of saturation magnetic flux density is set equal to or larger than 0.5[T].

16. The magnetic recording medium according to claim 13, wherein said magnetic substratum overlies on a non-magnetic substratum.

17. The magnetic recording medium according to claim 13, wherein a thickness of the magnetic substratum is set in a range between 0.1 nm and 3.5 nm.

18. The magnetic recording medium according to claim 17, wherein said magnetic substratum overlies on a non-magnetic substratum.

19. The magnetic recording medium according to claim 1, further comprising:
a substrate;
a non-magnetic substratum formed on the substrate and including Cr atoms; and
a magnetic substratum formed on the non-magnetic substratum and made of a Co-based alloy, the magnetic substratum including atoms belonging to at least one element selected from a group consisting of Cr, Ta, Mo, Mn, Re and Ru,
wherein the first magnetic recording layer is directly formed on the magnetic substratum.

* * * * *